Oct. 26, 1948.  A. NIELSEN  2,452,258
HAND TRUCK
Filed Feb. 11, 1946
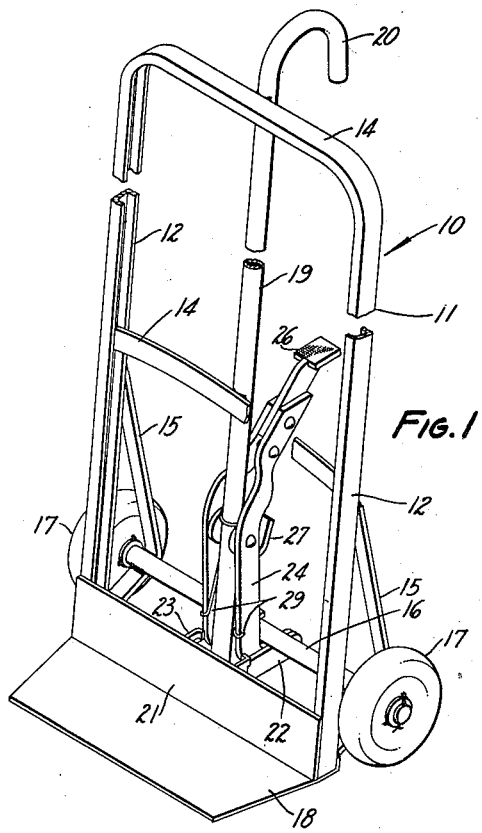
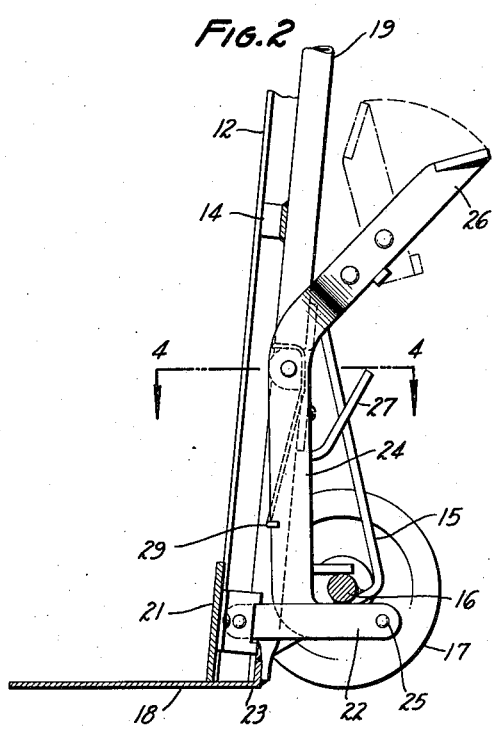
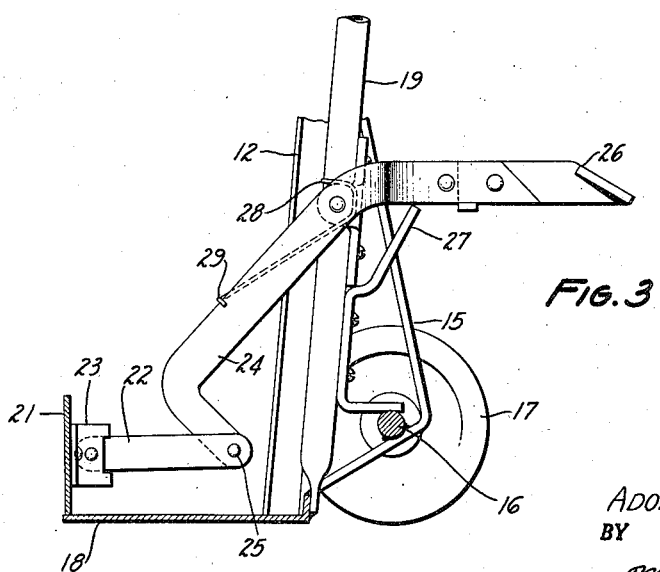
INVENTOR.
ADOLPH NIELSEN
BY
Mellin + Hanscom
ATTORNEYS Patented Oct. 26, 1948

2,452,258

UNITED STATES PATENT OFFICE 2,452,258

HAND TRUCK

Adolph Nielsen, Oakland, Calif.

Application February 11, 1946, Serial No. 646,758

1 Claim. (Cl. 214—82)

This invention relates to hand trucks of the two-wheel type for use in trucking crates, boxes, cartons and the like.

It is the principal object of my present invention to provide an improved hand truck of the character described which is equipped with simple and efficient unloading mechanism.

One form which the invention may assume is exemplified in the following description and illustrated by way of example in the accompanying drawings, in which:

Fig. 1 is a perspective view of a hand truck embodying the preferred form of my invention.

Fig. 2 is a fragmentary view in longitudinal section through the truck showing the manner of mounting the unloading mechanism thereon, and showing the unloading mechanism in normal condition.

Fig. 3 is a view similar to Fig. 2 with the exception that the unloading mechanism is shown in the position which it assumes when it is actuated to unload the truck.

Fig. 4 is a fragmentary view in transverse section through the center frame member of the truck frame showing the manner of connection of the actuating levers thereto taken on line 4—4 of Fig. 2.

Referring more particularly to the accompanying drawings, 10 indicates a two-wheeled hand truck embodying the preferred form of my invention. It should be pointed out here that the operation of this hand truck and its use are identical with conventional hand trucks of this type except for the unloading mechanism thereof, and it is with this unloading mechanism that this invention is particularly concerned.

The truck 10 comprises a rigid open frame 11 here shown as substantially rectangular in form and comprising longitudinal side frame members 12 rigidly connected by transverse frame members 14. Secured to the side frame members 12 at the lower end of the frame are rigid axle brackets 15 which project rearwardly. Extending between these axle brackets 15 and secured thereto by welding or otherwise is a transverse axle 16. This axle is disposed in parallelism to the frame 11 and extends transversely thereof at a spaced distance rearwardly with respect thereto. The opposite ends of the axle project laterally outward relative to the frame members 12 and are fitted at their outer ends with freely rotatable truck wheels 17. These wheels, of course, are disposed at opposite sides of the frame, as illustrated, but closely adjacent to the sides thereof.

At the wheeled lower end of the frame 11 the latter is provided with a forwardly projecting apron 18 which is fixed at its opposite ends to the side frame members 12 to form a rigid connection therebetween. The apron 18, when the frame 11 is in an upright position, as shown in the drawings, assumes a substantially horizontal position as is common to aprons of hand trucks of conventional type.

The frame 11 also includes a center frame member 19 which extends longitudinally of the frame intermediate the side frame members 12, and which is secured at its lower end to the apron 18. It is likewise secured to the transverse frame members 14 and becomes and is, of course, a rigid part of the entire truck frame 11. The upper end or extremity of the center frame member 19 projects upwardly beyond the uppermost transverse frame member 14 and is there hooked, as illustrated, to form a handle 20 by which the truck may be manipulated in conventional fashion.

For unloading the truck, I provide a rigid pusher plate 21 which is disposed transversely of the frame 11 at the front side thereof and is capable of lying flatwise against the side frame members 12 in close proximity to the apron 18. I intend that this plate be operable to move transversely of the apron 18 toward and away from the frame 11 for the purpose of unloading the truck. To accomplish this, the pusher plate 21 is pivotally connected to the forward ends of a pair of parallel links 22, which are spaced at equal distances on opposite sides of the longitudinal center of the truck frame and pivotally connected to the rear of the pusher plate through the medium of brackets 23 secured to the latter. These brackets are disposed substantially midway between the top and bottom edges of the pusher plate, as illustrated.

To actuate the pusher plate through the medium of the links 22, I provide a pair of relatively fixed actuating levers 24 which are pivoted intermediate their ends to the center frame member 19, as illustrated most clearly in Figs. 1 and 4. The lower ends of the actuating levers 24 extend from their pivotal point downwardly and thence at right angles rearwardly. The terminals of the lower ends of the actuating levers 24 are pivotally connected as at 25 to the rearmost ends of the links 22.

The dimensions of the links 22 and the formation of the actuating levers 24 are such that when the pusher plate 21 is in retracted position against the frame 11, the downwardly extending portions of the levers 24 lie at opposite sides of the center frame member 19 in a more or less unobstructing position. The links 22 and the rearwardly projecting ends of the levers 24 lie just below the axle 16, as illustrated in Fig. 2.

The upper ends of the actuating levers 24 extend angularly upward to a point spaced rearly of the frame 11, and are fitted at their upper terminals with a pedal 26. This pedal 26 is knee-jointed to the levers 24, as shown. That is to say, the pedal 26 can pivot relative to the levers 24 in one direction from a position coextensive with the levers but not in the opposite direction. This type of connection enables the pedal 26 to be placed in an unobstructing position, as illustrated in broken lines in Fig. 2, during the times that the unloading mechanism is not in use.

Obviously, downward swinging movement of the pedal 26 will be accompanied by forward swinging movement of the actuating levers 24 and forward movement of the links 22, causing the pusher plate 21 to move laterally across the apron 18 and separate any load which may be imposed upon the apron 18 from the frame 11. The amount of movement permitted the pusher plate in this direction is sufficient to enable the pusher plate to reach a point just short of the forward terminal of the apron 18, as illustrated in Fig. 3. The movement of the pusher plate 21 in this direction is limited by a stop member 27 secured on the center frame member 19 and adapted to engage the upper ends of the levers 24 to limit the downward movement thereof to the extent indicated.

I have provided spring means for returning the pusher plate 21 and its associated mechanism to normal or retracted position. This spring means includes a spring 28 engaged with the center frame member 19, as illustrated, and having spring arms 29 engaging the lower ends of the levers 24. This spring, as illustrated, normally tends to exert its influence to return the pusher plate 21 to its normal position against the front side of the frame 11.

In operation of the truck, it is constructed substantially as illustrated and described. The load is imposed on the truck in conventional fashion. Ordinarily, trucks of this type can discharge a stacked load by merely tilting the stack to raise the load off of the apron 18 and then withdraw the truck. This, however, is not entirely satisfactory. For example, if the load is to be stacked closely adjacent a wall, no tilting action can be given the stack. It is, therefore, difficult to unload the truck.

By means of my unloading mechanism, the truck conveys the stacked crates or other material to the point of discharge and then is permitted to assume an upright position with the apron 18 resting on the floor or ground. The operator then, by the use of his foot, depresses the pedal 26 which causes the pusher plate 21 to engage the outer side of the load and separate the load from the truck. If the load is imposed against a wall or other upright object, the pusher plate will cause the truck to be moved outwardly from the load and thereby separated therefrom.

I have found in actual practice that by the use of a truck equipped with an unloading mechanism such as here disclosed the normal and conventional trucking operations can be accomplished with greater rapidity and with considerably less effort on the part of the operator, and while I have shown the preferred form of my invention, it is to be understood that various changes may be made in its construction by those skilled in the art without departing from the spirit of the invention as defined in the appended claim.

Having thus described my invention, what I claim and desire to secure by Letters Patent is:

A hand truck comprising a flat open frame, an axle arranged transversely of the frame adjacent one end thereof and at the rear side of the frame, wheels carried by the axle, a rigid apron fixed to said wheeled end of the frame and projecting forwardly thereof at the opposite side of the frame from the axle, a pusher plate arranged transversely of the frame and normally lying flatwise against the front side of the frame in close proximity to the apron, a pair of links connected at their forward ends to the rear side of said plate and extending rearwardly, a pair of relatively fixed actuating levers pivoted intermediate their ends to the frame at a point on said frame spaced from said pusher plate, said actuating levers extending toward the pusher plate and thence rearwardly and connected at their terminals to the other ends of said links whereby oscillation of said levers will be accompanied by movement of the pusher plate across said apron toward and away from the frame, a pedal fitted to the other ends of said actuating levers to provide manual means for actuating the same.

ADOLPH NIELSEN.

REFERENCES CITED

The following references are of record in the file of this patent:

UNITED STATES PATENTS

| Number | Name | Date |
| --- | --- | --- |
| 1,710,893 | Phillips | Apr. 30, 1929 |
| 2,406,158 | Newport | Aug. 20, 1946 |